United States Patent Office 2,786,866
Patented Mar. 26, 1957

2,786,866

ESTERS OF DITHIOCARBAMIC ACIDS AND A METHOD FOR THEIR PREPARATION

Edwin O. Hook, New Canaan, Lindley C. Beegle, Darien, and Vernon P. Wystrach, Stamford, Conn., assignors to American Cyanamid Company, New York, N. Y., a corporation of Maine No Drawing. Application June 11, 1952, Serial No. 292,972

13 Claims. (Cl. 260—455)

This invention relates to the production of esters of dithiocarbamic acid and particularly to the production of acyclic esters of this class which are soluble in hydrocarbon oils and possess anti-oxidant and anti-corrosion properties in such oils. Many of these compounds also find use as rubber accelerators, insecticides, fungicides, mildew proofing agents and pharmaceuticals.

Hitherto, esters of dithiocarbamic acid have been prepared by several general methods available in the literature. One method in current employment has involved the use of an alkali metal salt of dithiocarbamic acid which is reacted with a halogen-containing compound in a double decomposition whereby the dithiocarbamic acid ester of the compound is obtained along with the alkali metal halide. Another method has involved the use of an ammonium salt of dithiocarbamic acid which is chemically combined with a compound in an addition reaction resulting in the formation of the dithiocarbamic acid ester.

It is to be noted that the free dithiocarbamic acid has not been used as such in the preparation of its esters due to its relative instability which has barred its use in such reactions. Consequently, among other considerations, the formation of the dithiocarbamate esters have previously required the formation of the dithiocarbamate salt as a prerequisite thereto.

Although these methods involving the use of salts of dithiocarbamic acid have proved generally acceptable in the art, they have not been regarded as completely satisfactory nor as the ultimate in simplicity or in efficiency inasmuch as they have necessarily involved an extra antecedent procedural step in the over-all ester production and have required additional reactants for the prior preparation of the salt and have resulted in the formation of undesirable intermediates and by-products along with the desired end-products.

It is therefore a principal object of the present invention to provide novel processes of preparing esters of dithiocarbamic acid which will involve a minimum of procedural steps, require fewer reactants and form fewer intermediates and by-products.

We have found that the methods of preparation of dithiocarbamic acid esters may be greatly simplified and the difficulties due to the relative instability of dithiocarbamic acid avoided and the prior preparation of a salt of dithiocarbamic acid obviated by preparing the dithiocarbamic acid in the presence of a compound containing an activated double bond to which it spontaneously adds to form the ester directly.

In this way, the difficulties due to the relative instability of the free dithiocarbamic acid are avoided and the formation of the esters thereof is accomplished as the result of a simple clean-cut reaction. No prior preparation of a dithiocarbamic salt is required, nor is the use of additional reactants required, nor are there any intermediates or by-products formed.

Among the amines which may be used in such a reaction are the primary and secondary aliphatic amines, the primary aromatic amines, the N-monoalkylated aromatic amines, and the cyclic amines.

As used herein, the term "aliphatic amine" is intended to include those amines attached to a cycloaliphatic radical, as well as those attached to an aliphatic radical. Also, the term "cyclic amine" is intended to include those amines wherein the nitrogen atom is a part of the cyclic radical, such as piperidine and morpholine.

It is to be observed that a requirement of such amines is that they possess an available hydrogen atom attached to the nitrogen atom. Without being bound to any particular theory as to the necessity of the available hydrogen atom, it is believed that such an atom is an indispensable factor in the mechanics of the ester-forming reaction and that it shifts, possibly in one or two steps, to the compound having the activated carbon to carbon double bond, thereby cooperating in the addition of the dithiocarbamic acid formed in situ to the compound having such an activated bond.

Examples of such amines would include aliphatic primary and secondary amines containing substituent groups such as methyl, ethyl, propyl, isopropyl, isopropoxypropyl, butyl, butenyl, amyl, allyl, benzyl, hexyl, cyclohexyl, etc. Aromatic amines such as aniline, toluidine, xylidine, naphthylamine, etc. or mixed aliphatic-aromatic amines (N-substituted), such as N-ethyl aniline, N-propyl toluidine, etc., are also of applicability in the present invention. Among the cyclic amines useful within the concept of the present invention are piperidine, morpholine, and the like.

As used herein, the compounds having an activated carbon to carbon double bond are intended to include those possessing activating means such as other double bonds or organic groups in the compound normally in a conjugated position with reference to the double bond to which the dithiocarbamic acid is expected to add in forming the ester. Examples of such activating means include groups such as:

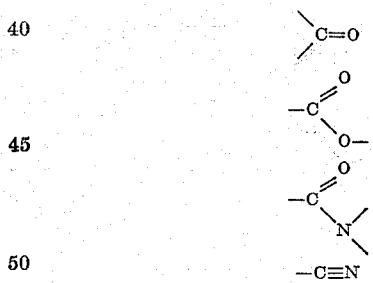

The relationship of these activating groups to the carbon to carbon double bond which they activate is shown as follows, with the activated double bond on the left hand side:

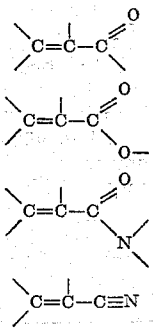

Specific examples of compounds containing such a carbon to carbon double bond and an activating means are: methyl vinyl ketone; ethyl vinyl ketone; benzalacetone; styryl ketone; ethylidene acetone; benzal acetophenone; ethyl acrylate; monoethylmaleate; diethyl maleate; benzyl acrylate; propyl crotonate; acrylamide; cinnamamide; crotonamide; acrylic acid; acylonitrile; crotonitrile; piperylene; dicyclopentadiene; and the like.

Although we have specifically set forth particular compounds which are preferably used in the novel methods of the present invention, it is to be emphasized that the invention in its broader aspect is not to be construed as limited thereto but is intended to include various other compounds of equivalent constitution as set forth in the claims appended hereto.

The preparation of the esters of dithiocarbamic acid esters in accordance with the present invention will be illustrated by the following examples which are considered representative of preferred embodiments of our inventive concept.

Example 1

The preparation of S-3-oxobutyl N N-diethyldithiocarbamate, corresponding to the formula:

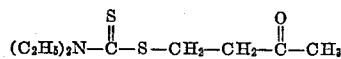

was as follows:

|  | Moles |
|---|---|
| Diethylamine, 73 g | 1.0 |
| Carbon disulfide, 76 g | 1.0 |
| Methyl vinyl ketone (85%), 83 g | 1.0 |

The diethylamine was added slowly to the methyl vinyl ketone causing an exothermic reaction to take place. The carbon disulfide was then added drop-wise to the reaction mixture and a second exotherm developed. After stirring for 30 minutes, the reaction was placed under a water pump vacuum and slowly warmed on a steam bath to remove water and any unreacted starting material. The yield of amber oil-insoluble liquid was 207 grams (94% of theory).

Example 2

The preparation of S-3-oxobutyl N N-di-n-butlyldithiocarbamate corresponding to the formula:

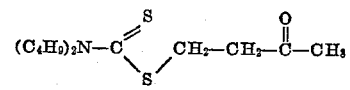

was as follows:

|  | Moles |
|---|---|
| Di-n-butylamine, 120 g | 1.0 |
| Carbon disulfide, 76 g | 1.0 |
| Methyl vinyl ketone (85%), 83 g | 1.0 |

The carbon disulfide and the methyl vinyl ketone were slurried together with good agitation. To this slurry, dibutylamine was added drop-wise causing a reaction to take place with the evolution of considerable heat. Stirring was continued for one half hour after the exothermic reaction had stopped and then the reaction mixture was placed under a water pump vacuum (30 mm. Hg) and heated to 90° C. on a steam bath. The yield of light amber, oil-soluble liquid was 275 grams (100% of theory). This material had the following analysis:

|  | Nitrogen, percent | Sulfur |
|---|---|---|
| Found | 4.98 | 21.3 |
| Theory | 5.09 | 23.28 |

Example 3

The preparation of S-3-oxobutyl N,N-bis(isopropoxypropyl) dithiocarbamate corresponding to the formula:

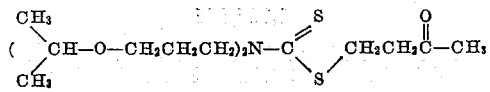

was as follows:

|  | Moles |
|---|---|
| Bis(isopropoxypropyl) amine, 74 g | 0.33 |
| Carbon disulfide, 25.5 g | 0.33 |
| Methyl vinyl ketone (85%), 28 g | 0.34 |

The carbon disulfide and the methyl vinyl ketone were mixed and slowly added to the bis-isopropoxypropyl amine. An exothermic reaction took place which was held to <30° C. by cooling the flask with an ice bath. Stirring was continued for one half hour after the exotherm had subsided, after which the reaction mixture was stripped to 90° C./25 mm. The yield of amber oil was 123 g. (quantitative). This material was soluble in oil up to 5% concentration.

Example 4

The preparation of S-3-oxobutyl N,N-dicyclohexyldithiocarbamate corresponding to the formula:

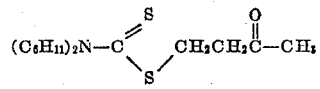

was as follows:

|  | Moles |
|---|---|
| Dicyclohexylamine, 90.5 g | 0.5 |
| Methyl vinyl ketone ((85%), 42 g | 0.5 |
| Carbon disulfide, 42 g | 0.55 |

The carbon disulfide and the methyl vinyl ketone were mixed together and the dicyclohexyl amine slowly added. An exothermic reaction took place which was held at 35° C. After the exotherm had subsided, the reaction mixture was heated to 70–75° for 20 minutes and then stripped to 90° C. under a water pump vacuum. The yield of dark red oil was 157.5 g. (96% of theory). This material was about 5% soluble in S. A. E. 10 oil.

Example 5

The preparation of S-3-oxobutyl N-n-butyl-N-3-oxobutyldithiocarbamate corresponding to the formula:

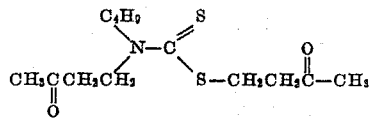

was as follows:

|  | Moles |
|---|---|
| Mono-n-butylamine, 73 g | 1.0 |
| Carbon disulfide, 76 g | 1.0 |
| Methyl vinyl ketone (85%), 166 g | 2.0 |

The n-butylamine was added slowly to the methyl vinyl ketone. An exothermic reaction took place and the reaction mixture was cooled to keep the temperature below 35° C. The carbon disulfide was then introduced drop-wise into the reaction mixture causing a second exotherm to take place. After stirring for one half hour, the reaction mixture was placed under a water pump vacuum and warmed on a steam bath in order to strip off the water and unreacted starting material. The yield of dark red oil-insoluble liquid was 245 g. or 85% of theory.

Example 6

The preparation of S-3-oxobutyl N-n-hexyl-N-3-oxo-butyldithiocarbamate corresponding to the formula:

$$\text{CH}_3\text{CCH}_2\text{CH}_2\underset{\underset{\text{O}}{||}}{\text{N}}-\text{C}\underset{\text{S}-\text{CH}_2\text{CH}_2\underset{\underset{\text{O}}{||}}{\text{C}}-\text{CH}_3}{\overset{\text{S}}{\diagup}}$$

(with $\text{C}_6\text{H}_{13}$ on N)

was as follows:

| | Moles |
|---|---|
| Mono-n-hexylamine, 34 g | 0.33 |
| Methyl vinyl ketone (85%), 54 g | 0.66 |
| Carbon disulfide, 25 g | 0.33 |

One half of the methyl vinyl ketone was added slowly to the n-hexyl amine with cooling to keep the temperature below 35° C. The remainder of the methyl vinyl ketone was mixed with the carbon disulfide and slowly added to the reaction mixture with cooling. After stirring for one hour the reaction mixture was stripped under a water pump vacuum on a steam bath to give 99 grams (94% of theory) of a dark red oil which can be dissolved to the extent of 2% in warm SAE 10 oil.

Example 7

The preparation of S-2-penten-1-yl N,N-di-n-butyldithiocarbamate corresponding to the formula:

$$(\text{C}_4\text{H}_9)_2\text{N}-\text{C}\overset{\text{S}}{\underset{\text{S}-\text{CH}_2-\text{CH}=\text{CH}-\text{CH}_2-\text{CH}_3}{\diagup}}$$

was as follows:

| | Moles |
|---|---|
| Di-n-butylamine, 129 g | 1.0 |
| Carbon disulfide, 76 g | 1.0 |
| Piperylene (1,3-pentadiene), 68 g | 1.0 |

The piperylene and the carbon disulfide were mixed and slowly added to the di-n-butyl amine. The reaction was exothermic during about ½ of the addition after which it was heated on the steam bath for one hour. The continued reflux of carbon disulfide indicated that the reaction did not go to completion. Water pump vacuum was applied to remove the unreacted material resulting in a residue of 182 g. (67% of theory) of a dark oil-insoluble liquid with an offensive odor.

Example 8

The preparation of a polycyclic ester of dithiocarbamic acid corresponding to the formula:

$$(\text{C}_2\text{H}_5)_2\text{N}-\text{C}\overset{\text{S}}{\diagup}\text{S}-\text{CH}_2\text{-(dicyclopentadienyl)}$$

was as follows:

| | Moles |
|---|---|
| Dicyclopentadiene, 66 g | 0.5 |
| Carbon disulfide, 42 g | 0.55 |
| Diethylamine, 36.5 g | 0.5 |

The carbon disulfide and the dicyclopentadiene were mixed and warmed to 40° C. The amine was added drop-wise at a rate sufficient to maintain the temperature at 50–55° C. After the exotherm had subsided, the reaction mixture was warmed on a steam bath for one hour and then stripped to 93° C./0.1 mm. Hg to give 108 g. (77% of theory) of an amber oil. On standing, the oil crystallized and, after dissolving in 300 ml. hexane, treating with "Darco," and cooling, there were obtained 58 g. of light yellow crystals. Recrystallization from hexane a second time gave pure white material M. P. 76–80° C. with the following analysis:

| | Nitrogen | Sulfur |
|---|---|---|
| Found | 4.86 | 22.1 |
| Theory | 4.98 | 22.8 |

Example 9

The preparation of S-carboethoxyethyl N,N-diethyldithiocarbamate corresponding to the formula:

$$(\text{C}_2\text{H}_5)_2\text{N}-\text{C}\underset{\text{S}-\text{CH}_2\text{CH}_2\underset{\underset{\text{O}}{||}}{\text{C}}-\text{OC}_2\text{H}_5}{\overset{\text{S}}{\diagup}}$$

was as follows:

| | Moles |
|---|---|
| Ethyl acrylate, 100 g | 1.0 |
| Carbon disulfide, 84 g | 1.1 |
| Diethylamine, 73 g | 1.0 |

The amine was added drop-wise to a well-stirred mixture of the carbon disulfide and the ethyl acrylate. After the exothermic reaction had subsided, the reaction was heated on a steam bath for 30 minutes. Volatiles were stripped off on a steam bath at 0.1 mm. Hg giving 239.5 grams (96% of theory) of a dark amber oil-insoluble oil.

Example 10

The preparation of S-B-cyanoethyl N,N-diethyldithiocarbamate corresponding to the formula:

$$(\text{C}_2\text{H}_5)_2\text{N}-\text{C}\overset{\text{S}}{\underset{\text{S}-\text{CH}_2-\text{CH}_2-\text{CN}}{\diagup}}$$

was as follows:

| | Moles |
|---|---|
| Acrylonitrile, 53 g | 1.0 |
| Carbon disulfide, 83 g | 1.1 |
| Diethylamine, 73 g | 1.0 |

The amine was added drop-wise to the mixture of carbon disulfide and acrylonitrile. After the exothermic reaction had subsided the reaction mixture was heated on a steam bath for 30 minutes then stripped under a water pump vacuum. The yield of yellow oil-insoluble oil was 198 g. or 98% of theory.

Example 11

The preparation of S-B-carboxyethyl N,N-diethyldithiocarbamate corresponding to the formula:

$$(\text{C}_2\text{H}_5)_2\text{N}-\text{C}\underset{\text{S}-\text{CH}_2\text{CH}_2\underset{\underset{\text{O}}{||}}{\text{C}}-\text{OH}}{\overset{\text{S}}{\diagup}}$$

was as follows:

| | Moles |
|---|---|
| Acrylic acid (60%), 120 g | 1.0 |
| Sodium hydroxide, 40 g | 1.0 |
| Diethylamine, 73 g | 1.0 |
| Carbon disulfide, 83 g | 1.1 |

To the sodium hydroxide which had been dissolved in 400 ml. water was added the acrylic acid, followed by the amine. When the carbon disulfide was added to this solution, little, if any, exotherm took place. After stirring at room temperature for 30 minutes, the reaction mixture was heated for 30 minutes on a steam bath refluxing the carbon disulfide. The solution was treated with "Darco" and filtered. Sixteen grams of carbon disulfide were separated from this solution which was then given a second "Darco" treatment. After cooling in an ice bath the solution was acidified to Congo red with hydrochloric acid. An oil separated which solidified on stirring. This solid was filtered off and well washed with water to give 31 g. (only 14% of theory) of a grey solid. Recrystallization from 40% ethanol gives an off-white crystalline material, M. P. 90–94° C. Titration of a dilute alcohol solution of this material with 0.1002 N sodium hydroxide gave 223 as its equivalent weight. The theoretical equivalent weight of the expected product is 221.

*Example 12*

The preparation of S-1,2-dicarboethoxyethyl N,N-dimethyldithiocarbamate corresponding to the formula:

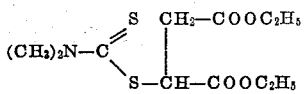

was as follows:

| | Moles |
|---|---|
| Diethyl maleate, 86 g | 0.5 |
| Carbon disulfide, 38 g | 0.5 |
| Dimethylamine, 23 g | 0.5 |

The dimethylamine was bubbled into a mixture of the carbon disulfide and the diethylmaleate. An exothermic reaction took place. After standing overnight a small amount of crystalline material was filtered off and the filtrate stripped to 92° C./0.1 mm. Hg giving 143 g. (97% of theory) of a yellow oil-insoluble liquid. On standing the oil crystallized. Recrystallization from hexane gave a white crystalline product, M. P. 38–40° C. with the following analysis:

| | Nitrogen | Sulfur |
|---|---|---|
| Found | 4.79 | 19.5 |
| Theory | 4.78 | 21.8 |

*Example 13*

The preparation of S-1,2-dicarboethoxyethyl N,N-di-n-butyldithiocarbamate corresponding to the formula:

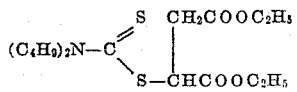

was as follows:

| | Moles |
|---|---|
| Diethylmaleate, 86 g | 0.5 |
| Carbon disulfide, 42 g | 0.55 |
| Di-n-butylamine, 64.5 g | 0.5 |

The amine was added drop-wise to a mixture of the carbon disulfide and maleate. An exothermic reaction took place which was maintained at 60–65° C. by regulating the rate of addition. After warming on the steam bath for 15 minutes, the volatiles were stripped to 93° C./0.1 mm. Hg to give 178.5 g. (95% of theory) of a yellow liquid which had the following analysis:

| | Nitrogen | Sulfur |
|---|---|---|
| Found | 3.36 | 16.6 |
| Theory | 3.82 | 17.5 |

This material was 5% soluble in SAE 10 oil at room temperature.

*Example 14*

The preparation of the compound corresponding to the formula:

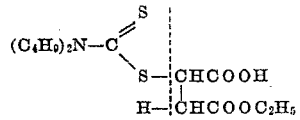

was as follows:

| | Moles |
|---|---|
| Monoethyl maleate, 74 g | 0.50 |
| Carbon disulfide, 42 g | 0.55 |
| Di-n-butylamine, 64.5 g | 0.50 |

The di-n-butylamine was slowly added to the well-stirred suspension of the monoethyl maleate in carbon disulfide. The reaction temperature was held to <35° C. by cooling when necessary and the reaction mixture was stirred for an additional hour after the exotherm had subsided. Volatiles were stripped off under vacuum on a steam bath to give 153.5 g. (87% of theory) of a viscous, light yellow, oil-insoluble liquid.

Consideration of the foregoing description and examples of our novel processes will indicate that the esters of dithiocarbamic acid produced thereby will possess the following generic structural formula:

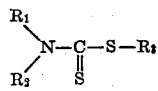

wherein $R_1$ and $R_2$ may be hydrogen or an aliphatic, aromatic or cycloaliphatic radical, or may be combined to form a cyclic radical to include the nitrogen atom therein, such as the piperidyl radical; and $R_3$ is a monovalent radical formed by the addition of a hydrogen atom to a double bond in an unsaturated compound. The acyclic nature of such an ester is to be noted, particularly in those compounds formed from secondary amines as a starting material.

Although we have described but a few specific examples of our inventive concept, we consider the same not to be limited thereto nor to the particular substances mentioned therein but to include various other compounds of equivalent constitution as set forth in the claims appended hereto. It is understood, of course, that any suitable changes, variations and modifications may be made without departing from the spirit and scope of the invention.

We claim:

1. A method of producing an ester of dithiocarbamic acid which comprises reacting a member of the group consisting of the primary and secondary aliphatic amines, the primary aromatic amines, the N-monoalkylated aromatic amines, piperidine and morpholine with carbon disulfide in the presence of a compound having an activated carbon to carbon double bond to which the dithiocarbamic acid formed in situ spontaneously adds.

2. The method as defined in claim 1, wherein the compound having an activated carbon to carbon double bond is methyl vinyl ketone.

3. The method as defined in claim 1 wherein the compound having an activated carbon to carbon double bond is ethyl acrylate.

4. The method as defined in claim 1 wherein the compound having an activated carbon to carbon double bond is diethyl maleate.

5. The method as defined in claim 1 wherein the compound having an activated carbon to carbon double bond is acrylonitrile.

6. The method as defined by claim 1 wherein the compound having an activated carbon to carbon double bond is acrylic acid.

7. A method of producing an ester of dithiocarbamic acid which comprises reacting an aliphatic amine having an available hydrogen atom attached to the nitrogen atom with carbon disulfide in the presence of a compound having an activated carbon to carbon double bond to which the dithiocarbamic acid formed in situ spontaneously adds.

8. The method as defined in claim 7 wherein the amine is dicyclohexylamine.

9. The method as defined in claim 7 wherein the aliphatic amine is bis isopropoxy propylamine.

10. A method of producing an ester of dithiocarbamic acid which comprises reacting a dialkylamine having a hydrogen atom attached to the nitrogen atom with carbon disulfide in the presence of a compound having an activated carbon to carbon double bond to which the dithiocarbamic acid formed in situ spontaneously adds.

11. The method as defined in claim 10 wherein the dialkylamine is diethylamine.

12. The method as defined in claim 10 wherein the dialkylamine is di-n-butylamine.

13. The method as defined in claim 10 wherein the dialkylamine is dimethylamine.

References Cited in the file of this patent

UNITED STATES PATENTS

| | | |
|---|---|---|
| 2,579,384 | Handy et al. | Dec. 18, 1951 |
| 2,710,872 | Thompson | June 14, 1955 |